United States Patent [19]

Nitsch et al.

[11] 3,763,367

[45] Oct. 2, 1973

[54] VEHICULAR LIGHT WITH FLANGE-FASTENED LENS

[75] Inventors: Edward J. Nitsch, Camillus; Fred F. Stube, Syracuse, both of N.Y.

[73] Assignee: R. E. Dietz Co., Syracuse, N.Y.

[22] Filed: Apr. 29, 1971

[21] Appl. No.: 138,465

[52] U.S. Cl. .............................. 240/7.1 R, 240/90
[51] Int. Cl. ......................... F21v 15/04, B60q 9/00
[58] Field of Search ...................... 240/7.1 R, 8.1 A, 240/8.2, 8.3, 90; 220/DIG. 19; 277/207

[56] References Cited
UNITED STATES PATENTS

| | | | |
|---|---|---|---|
| 3,484,600 | 12/1969 | Fradette | 240/8.3 X |
| 3,187,171 | 6/1965 | Trautner | 240/7.1 R |
| 3,145,933 | 8/1964 | Dickson | 240/8.3 X |
| 2,118,746 | 5/1938 | Tinnerman | 220/DIG. 19 |
| 2,657,948 | 11/1953 | Sturtevant | 220/DIG. 19 |

*Primary Examiner*—Richard C. Queisser
*Assistant Examiner*—Daniel M. Yasich
*Attorney*—Bruns & Jenney

[57] ABSTRACT

A vehicle light having a tubular base in any one of a variety of styles has a cup-shaped lens having angularly spaced, outwardly projecting flanges around its open end. The base has one open end to which is secured an annular metal plate having angularly spaced, inwardly projecting flanges spaced outwardly of the plate. A resilient annular gasket between lens and plate is compressable for inserting the lens flanges between the plate flanges and then turning the lens with its flanges under those of the plate. The lens encloses a lamp and its socket which may be attached directly to the metal plate or to a second plate which is attached to the gasket by novel means for shock-proof mounting.

1 Claim, 21 Drawing Figures

INVENTORS.
EDWARD J. NITSCH &
FRED F. STUBE
BY
Bruns & Jenney
ATTORNEYS

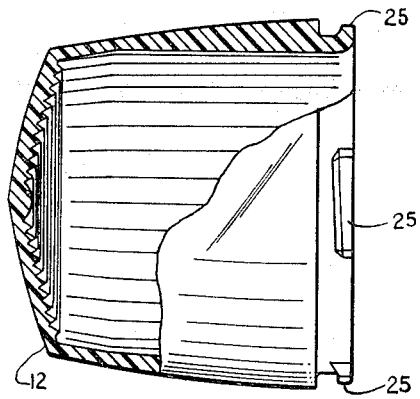
Fig. 6
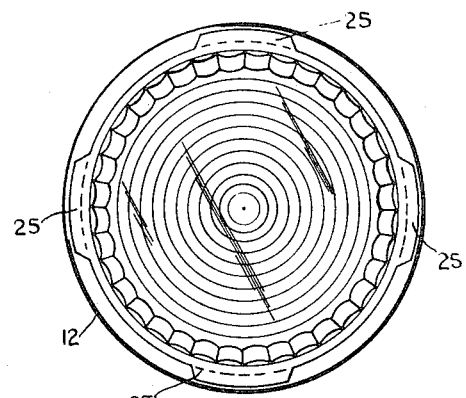
Fig. 7
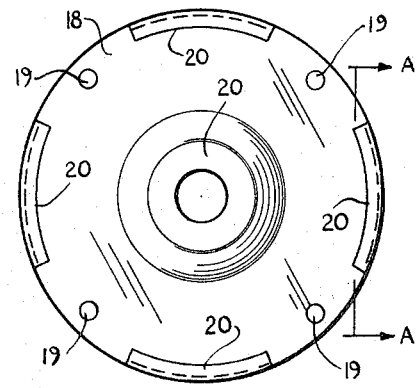
Fig. 8
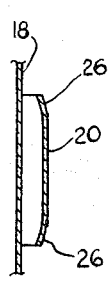
Fig. 8A
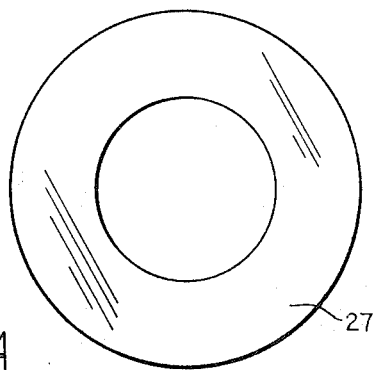
Fig. 9
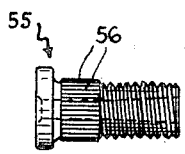
Fig. 11
Fig. 12
Fig. 10
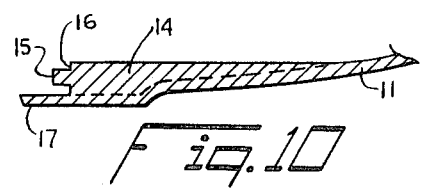
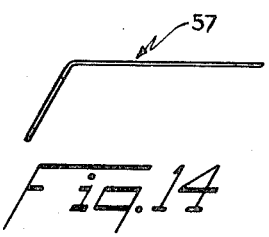
Fig. 13  Fig. 14

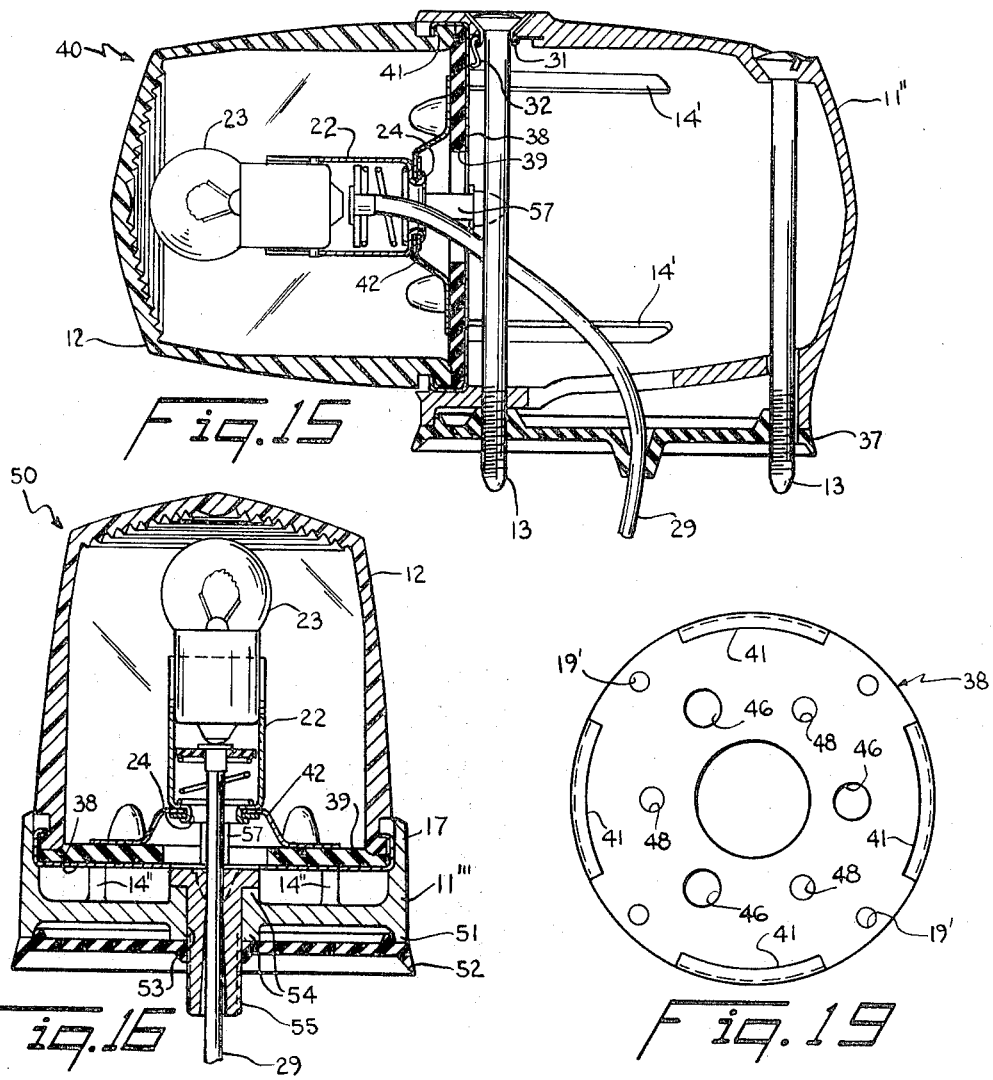
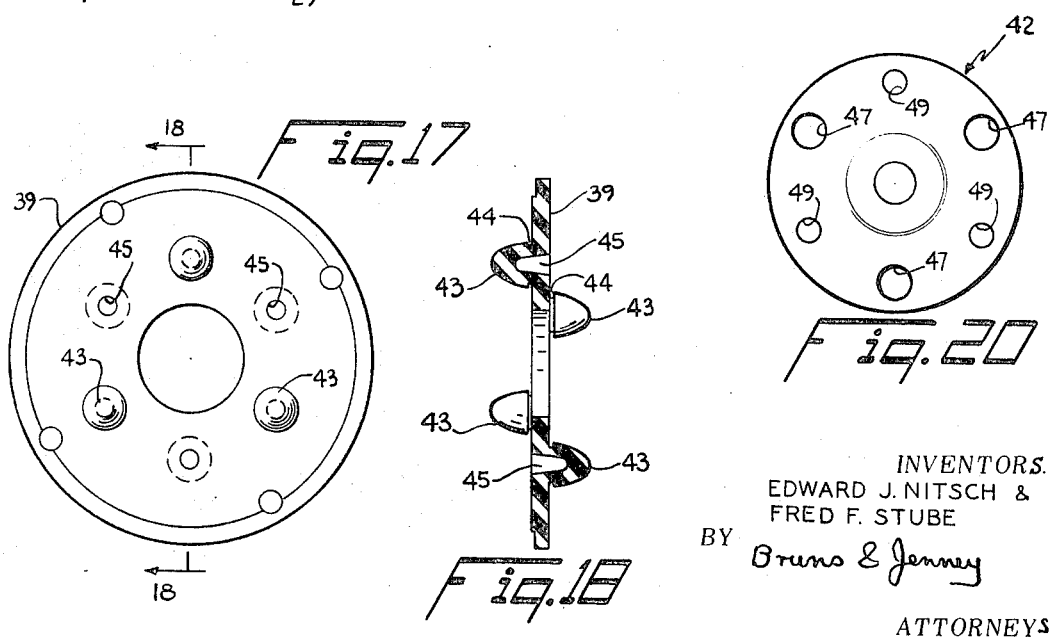

VEHICULAR LIGHT WITH FLANGE-FASTENED LENS

BACKGROUND OF THE INVENTION

This invention relates to vehicular lights and more particularly to such lights having a cup-shaped lens secured to the open end of a tubular base.

Prior art lights having cup-shaped lenses had either "snap-on" lenses with an interior groove at the open end of the lens which snapped on to an outwardly projecting ridge around a projecting flange around the open end of the tubular base, or the lens was secured to the base by a comparatively delicate bezel, or had screw-holes through the lens for securing the lens to the body with screw fasteners. The snap-on lenses are insecure for large and heavy lenses and the screw fasteners are unsightly and time-consuming to install.

SUMMARY OF THE INVENTION

The present invention comprises providing the open end of the lens with a reduced portion having angularly spaced, outwardly projecting flanges therearound engageable under inwardly projecting, angularly spaced flanges of an annular metal plate secured to the open end of the tubular base. The base has a plurality of longitudinally extending ribs angularly spaced around the interior thereof and providing a shoulder against which the plate is seated. The ribs have stud portions extending outwardly of the open end of the base which pass through holes in the perimeter of the annular plate and are rivetted over or flattened to secure the plate to the body.

An annular gasket of rubber or other resilient material is placed next to the plate and under its inwardly projecting flanges so that when the lens is pressed against the gasket and turned the flanges of the lens slide under the plate flanges and are held against the latter by the resiliency of the gasket.

An annular flange projecting outwardly of the open end of the base conceals the reduced portion of the lens at its open end and the flanges.

In one form, the flanged plate has a central portion projecting through the central opening of the gasket to which the lamp socket is secured in conventional manner. In another form, the lamp and socket are mounted in shock-proof manner, the resilient gasket being molded and having protuberances on one surface projecting through seating holes in the flanged plate and similar protuberances on the other surface projecting through seating holes in a second smaller plate to which the socket is secured in conventional manner. The protuberances have a reduced diameter adjacent the gasket body forming a shoulder for engaging the plates and the plates and protuberances have cooperating smaller holes therein so that a rod inserted in these holes can be used to force the protuberances through the seating holes.

The base may be of various tubular shapes and may be of metal or resinous plastic material and the lens may be of any suitable shape, cupped so as to surround the lamp and socket and of any transparent or translucent material.

BRIEF DESCRIPTION OF THE DRAWINGS

FIG. 6 is a side elevational view, partly in section, of the lens shown in FIG. 1;

FIG. 7 is a plan view thereof as viewed from the right in FIG. 6;

FIG. 8 is a plan view of the flanged plate member shown in FIG. 1;

FIG. 8A is a fragmentary sectional view on the line AA of FIG. 8.

FIG. 9 is a plan view of the gasket shown in FIG. 1;

FIG. 10 is a fragmentary sectional view on the line 10—10 of FIG. 1;

FIGS. 11 and 12 are, respectively, a side elevational view and a bottom plan view of a mounting stud shown in FIG. 16;

FIGS. 13 and 14 are, respectively, a plan view and a side elevational view of an electrical circuit member shown in FIGS. 15 and 16;

FIG. 15 is a longitudinal sectional view of another modified form of light;

FIG. 16 is a longitudinal sectional view of still another modified form of light;

FIG. 17 is a plan view of the gasket member shown in FIGS. 15 and 16;

FIG. 18 is a sectional view on the line 18—18 of FIG. 17;

FIG. 19 is a plan view of the flanged plate member shown in FIGS. 15 and 16; and FIG. 20 is a plan view of the second plate member shown in FIGS. 15 and 16.

DESCRIPTION OF THE PREFERRED EMBODIMENT

Figures 1, 3:
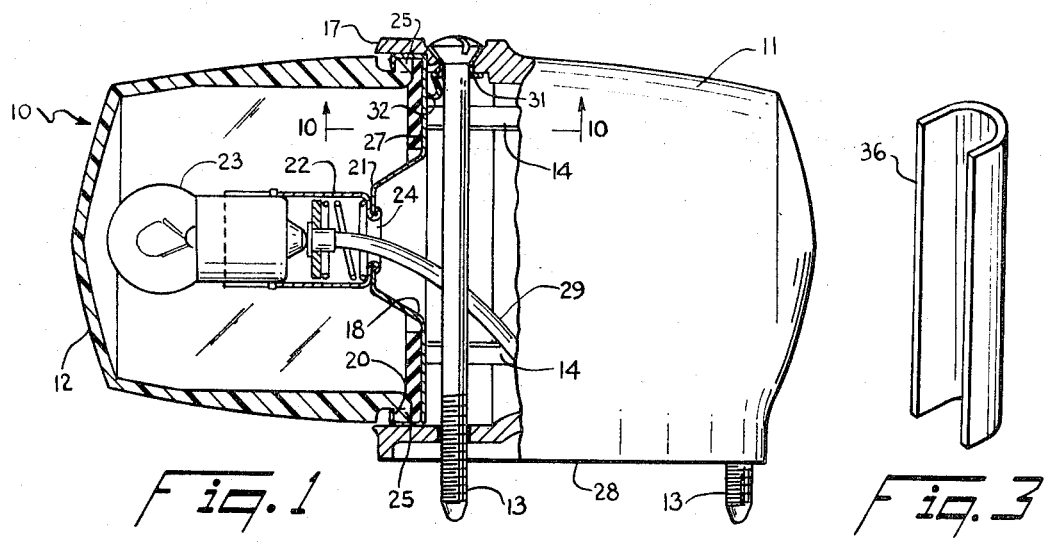
FIG. 1 is a side elevational view, partly in section of a light embodying the invention.
FIG. 3 is a perspective view of a stiffening member shown in FIG. 2.

Referring to FIG. 1 a light 10, according to the invention, has a tubular base 11 and a cup-shaped lens 12, each open at one end. Two elongated screws 13 are provided, passing through appropriate holes in base 11 for fastening it to the vehicle body.

Base 11 has four longitudinally extending interior strengthening ribs 14, best seen in section in FIG. 10, terminating, except for a projecting stud portion 15 in a shoulder 16 coplanar with a like shoulder around the interior of the base at its open end. The base has an annular flange 17 therearound exterior to shoulder 16 for cosmetic reasons.

An annular plate member 18, best seen in FIGS. 8 and 8A, is secured against the shoulder 16 by the studs 15 at the ends of ribs 14 passing through the holes 19 angularly spaced adjacent the perimeter of plate 18 and then rivetted over or flattened. Between the holes 19 four outwardly bent portions of the plate terminate with inwardly projecting flanges 20. At its center the plate member 18 is outwardly dished at 21, the central hole in the dished portion providing a seat for the socket 22 which, with its lamp 23, is contained within lens 12. A tubular portion 24 of the socket passes through the central hole of plate 18 and is peened over in conventional manner to secure the socket to the plate.

Lens 12, best seen in FIGS. 6 and 7, has a reduced portion adjacent its open end from which project four flanges 25 adapted to fit between the flanges 20 of plate 18 and to underlie the plate flanges when the lens is turned. Flanges 25 may be slightly inclined, as shown in FIG. 6, with respect to the open end of the lens or may be parallel with the end plane. Flanges 20 on plate 18, however, are substantially parallel with the main portion of the plate and preferably have end portions 26 inclined inward, as shown in FIG. 8A, to lock lens flanges 25 in place.

An annular gasket 27, shown in FIG. 9, is positioned between plate 18 and the open end of the lens, under flanges 20 and 25. The gasket is of resilient material and is compressed when flanges 25 are turned under flanges 20 so that the compressed portion of the gasket biases the flanges in engagement.

The light base 11 has a flat portion 28 along one curved side which is adapted to be secured by screws 13 against a portion of the vehicle body, with an intervening resilient pad. This flat portion has an opening therethrough for a lead wire 29 which extends through the neck 24 of the socket.

Figure 2:
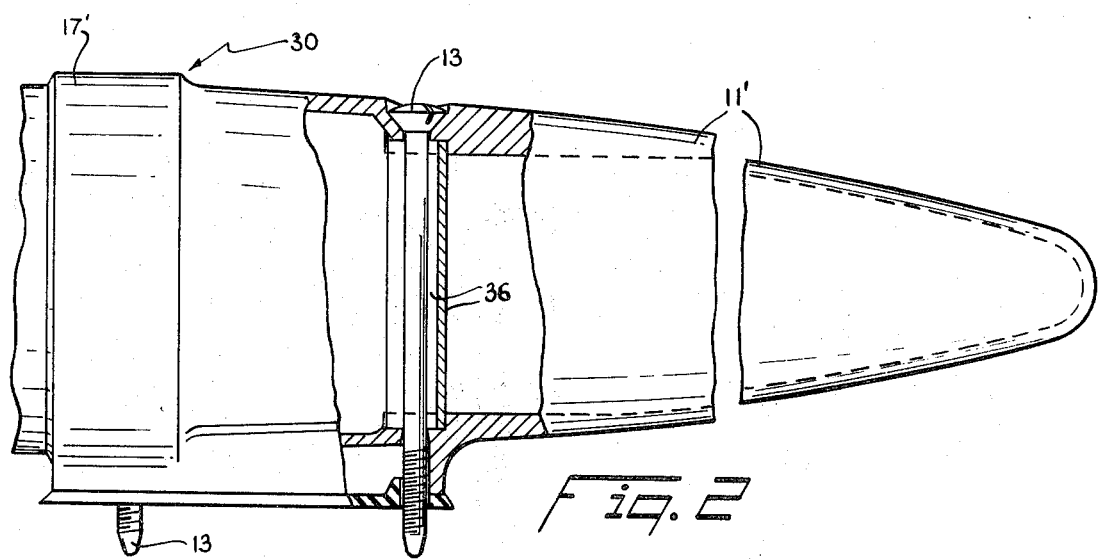
FIG. 2 is a fragmentary side elevational view partly in section, of a modified form of light.

In FIG. 2, a light 30 is shown having an elongated base 11' for use where a decorative streamlined appearance is desired. The base 11' forward of the rearward screw 13 is identical with the above described base 11.

Figures 4, 5:
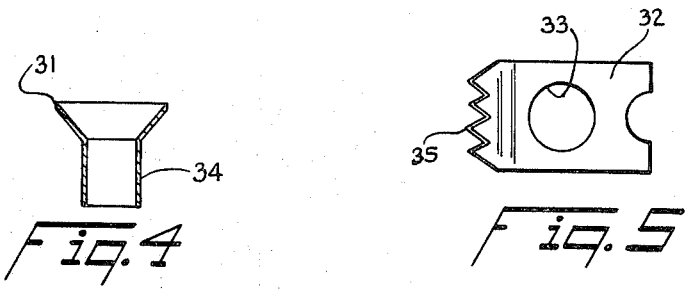
FIGS. 4 and 5 are, respectively, a sectional view and a plan view of electrical circuit parts shown in FIG. 1.

Bases 11 and 11' may be of die cast metal or molded plastic material. Where plastic, a funnel shaped screw seat 31 of metal, shown in FIG. 4, and a metal contact member 32, shown in FIG. 5, are used in conjunction with the forward screw 13 as shown in FIG. 1. Member 32 has a hole 33 therethrough through which the screw seat projects and when screw 13 is assembled the neck 34 is peened over to hold member 32 in place. Member 32 has a toothed edge 35 adapted to contact plate 18 when the plate is assembled to base 11 or 11', the toothed edge being sprung back in contact with the plate for electrically connecting plate 18 and screw 13. Socket 22 is therefor grounded to the vehicle electrical system through the screw 13.

A reinforcement 36 is shown in FIG. 3 for reinforcing a plastic base 11' around the rearward screw 13 as shown in FIG. 2, the ends of the trough shaped reinforcement 36 engaging suitable seats in the base, as shown.

In FIG. 15, a base 11" is shown provided with a pad 37 and a modified form of flange plate 38 and gasket 39 to form a light 40 having a shock-proof mount for the socket 22 and lamp 23.

Flange plate 38 is annular and provided with holes 19' for the studs 15 at the ends of ribs 14' of body 11 but has no forwardly dished center portion as in the plate 18. It has inwardly projecting flanges 41 spaced forwardly of the main portion of the plate for engagement with flanges 25 of the lens and a second, forwardly dished plate member 42, smaller than the plate 38, is provided, to which the socket 22 is secured.

The gasket 39 is annular and of molded rubber or similar material. Three integral acorn-shaped protuberances 43 are provided projecting from each surface. Protuberances 43 are angularly spaced at a common radius around the gasket 39, as best seen in FIGS. 17 and 18, and each has a reduced portion adjacent the surface from which it protrudes forming a shoulder 44 facing the gasket surface. Centrally of each protuberance, a hole 45 extends from the opposite surface into the protuberance short of its end.

The plate 38, best seen in FIG. 19, is provided with three holes 46 into which protuberances 43 on one side of the gasket are adapted to be forced, the holes 46 being slightly smaller than the protuberances. A rod or other tool can be pushed into hole 45 of a protuberance, stretching it so as to reduce its diameter, thereby forcing the protuberance through hole 46 and engaging shoulder 44 with the far surface of the plate.

The second dished plate 42, best seen in FIG. 20, is provided with three similar holes 47 equally spaced for reception of the protuberances 43 on the other surface of the gasket. Plates 38 and 42 are also provided with smaller holes 48 and 49, respectively, between the protuberance receiving holes, aligned with holes 45 of the protuberance on the far side of each plate giving access for the rod or other tool used in assembly or disassembly.

In FIG. 16, a light 50 is provided with another modified form of base 11''' adapted so that its lens 12 projects away from the vehicle body surface to which it is secured. Base 11''' is tubular but short in length and has reinforcing ribs 14'' and projecting flange 17 at its open end as described above for body 11'''. Light 50 has a shock-proof mount for socket 22 and lamp 23 comprising plates 38 and 42 and gasket 39 and is provided with lens 12.

The closed end 51 of base 11''' is round and flat and is provided with a pad 52. At its center the end 51 has a hole 53 with suitable reinforcing bosses 54—54, as shown, and a bolt 55, shown in FIGS. 11 and 12, is secured in hole 53, the bolt being hollow for containing lead wire 29. Bolt 55 has knurled ridges 56 at its upper end adjacent its head, as is conventional, and its lower end is threaded.

Both light 40 and light 50, being shock mount lights, have a metal connecting strip 57 electrically connecting the second dished plate 42 to plate 38. The strip 57 is enlarged at one end for a comparatively large hole 58 so that this end can be assembled next to plate 42, the tubular end 24 of the socket being peened over to secure the plate and strip in electrical contact. The strip 57 is thin and flexible and has a smaller hole 59 at its other end through which a rivet, not shown, can pass for securing it to the plate 38.

It will now be apparent that there has been provided an easily assembled lens and base combination with provision for a variety of base styles and in which the lens is easily removed for replacement of the lamp. Provision is also made for a novel shock-proof mount for socket and lamp in all of the base styles.

We claim:

1. A vehicle light comprising a lens and a base, each having an annular opening at one end, a first annular plate secured to the base at its open end, the plate having means at its periphery for securing it to the open end of the lens, a gasket of resilient material, a lamp socket, and a second dished annular plate having an aperture in which the socket is secured, the gasket having a plurality of integral acorn shaped protuberances on each opposed surface, each protuberance having a reduced portion adjacent the respective gasket surface forming a shoulder facing the surface from which it protrudes and a central hole extending in each protuberance from the opposite surface and terminating short of the protuberance end, each plate having holes through which the protuberances may be forced and smaller holes aligned with the protuberance holes, the second plate being secured to the first plate by the protuberances on one surface of the gasket being forced through receiving holes in the first plate and the protuberances on the opposed surface being forced through receiving holes in the second plate, whereby the socket is shock-proof mounted.

* * * * *